United States Patent Office 3,092,597
Patented June 4, 1963

3,092,597
POLYESTER RESINS
Robert E. Leech and Julian K. Rose, South Charleston, W. Va., assignors to Union Carbide Corporation, a corporation of New York
No Drawing. Filed July 18, 1958, Ser. No. 749,322.
10 Claims. (Cl. 260—29.2)

This invention relates to a novel class of synthetic resinous polyesters which are useful in coating and molding applications, and to a process for their preparation. In one of its aspects, this invention relates to a class of spirobi(meta-dioxane) polyester resins which are water-soluble and adapted upon simple heat treatment to yield tough, hard, shaped articles such as films, sheets and molded forms which are infusible, and which are insoluble in common solvents such as water, acetone, methanol, ethanol, benzene, diethyl ether, pentane, hexane, and the like.

The resinous polyesters of this invention are produced by a process which comprises (1) forming an intermediate polyester condensate by heating and condensing at a temperature within the range between about 125° C. and 225° C. a mixture comprising (a) a spirobi(meta-dioxane) compound having the structure:

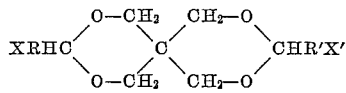

wherein R and R', respectively, designate a member of the class consisting of the divalent aliphatic radicals of the formula $C_nH_{2n}$ wherein $n$ is an integer from 2 to 18, and the cyclohexylene radical; and X and X', respectively, designate a member of the class consisting of the —COOR² radicals wherein R² designates a member of the class consisting of hydrogen and the alkyl radicals having one to fourteen carbon atoms; and (b) a member of the class consisting of the alkanediols of the structure $C_mH_{2m}(OH)_2$ where $m$ is an integer from 2 to 10 and the polyoxyalkylene diols of the structure $$HOCH_2CHR^3(OCH_2CHR^3)_pOH$$

where R³ is of the class consisting of hydrogen and the methyl radical, and $p$ is an integer from 1 to 3, the said diol and spirobi(meta-dioxane) compound being reacted in the range of molar ratios of from 1:1 to 5:1, said diol having a boiling point higher than that of the by-product R²OH, removing the by-product R²OH as it is formed, and continuing the heating until substantially all formation and evolution of the R²OH has ceased; and (2) treating said intermediate polyester condensate at a temperature within the range between about 60° C. and 100° C. with between about 10 percent and 100 percent by weight of water, based on the weight of intermediate polyester condensate, in the presence of a catalytic quantity of acid for a period of time between about 1 and 6 hours.

The resinous polyesters of this invention are viscous, clear liquids in bulk. They yield tough, flexible films when shaped and heat-cured as hereinafter described. Solutions of the polyesters in water or organic solvents are useful coating and impregnating compositions, yielding protective coatings which adhere firmly and can be rendered infusible, and insoluble in substantially all of the common organic solvents.

In a preferred embodiment of this invention particularly adapted for producing aqueous solutions of the novel class of resinous polyesters of this invention, a process is employed which comprises (1) forming an intermediate polyester condensate by heating and condensing at a temperature within the range between about 125° C.

and 225° C. in an inert atmosphere a mixture comprising (a) a spirobi(meta-dioxane) compound having the structure:

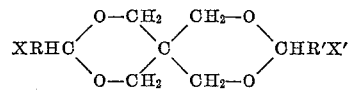

wherein R and R', respectively, designate a member of the class consisting of the divalent aliphatic radicals of the formula $C_nH_{2n}$ wherein $n$ is an integer from 2 to 18, and the cyclohexylene radical; and X and X', respectively, designate a member of the class consisting of the —COOR² radicals wherein R² designates a member of the class consisting of hydrogen and the alkyl radicals having one to fourteen carbon atoms; and (b) a member of the class consisting of the alkanediols of the structure $C_mH_{2m}(OH)_2$ where $m$ is an integer from 2 to 10 and the polyoxyalkylene diols of the structure $$HOCH_2CHR^3(OCH_2CHR^3)_pOH$$

where R³ is of the class consisting of hydrogen and the methyl radical, and $p$ is an integer from 1 to 3, the said diol and spirobi(meta-dioxane) compound being reacted in the range of molar ratios of from 1:1 to 5:1, said diol having a boiling point higher than that of the by-product R²OH, removing the by-product R²OH as it is formed, and continuing the heating until substantially all formation and evolution of the R²OH has ceased; and (2) hydrolyzing said intermediate polyester condensate polyester condensate with between about 50 percent and 100 percent by weight of water in the presence of between about 0.01 percent and 5.0 percent by weight of acid catalyst, based on the weight of intermediate polyester condensate, at a temperature within the range between about 60° C. and 100° C. until a homogeneous solution is formed.

In reaction stage (1) of the process, the condensation of the diol and the spirobi(meta-dioxane) compound to produce the intermediate polyester condensate is conducted at a temperature between about 125° C. and 225° C., with the preferred temperature range being between about 150° C. and 175° C., and the molar ratio of diol to spirobi(meta-dioxane) compound is maintained in the range between about 1:1 and 5:1, with the preferred molar ratios being between about 1.1:1 and 1.5:1. When a spirobi(meta-dioxane) diacid is one of the reactants any of the well-known acidic polyesterification catalysts can be used, such as sulfuric acid, diethyl sulfate, methanesulfonic acid, toluenesulfonic acid, zinc chloride, and the perfluoroalkanoic acids. The reaction of a spirobi(meta-dioxane) diester with the diol is catalyzed by any of the usual ester exchange catalysts, such as the foregoing and the tetraalkyl titanates, dialkyl phosphates, litharge, alkali metal alcoholates and hydroxides, alkaline earth metal oxides, antimony trioxide, boron trifluoride, cadmium, magnesium and zinc salts of alkanoic acids such as acetic and propanoic acids, and metals such as lithium, potassium, sodium, magnesium, zinc, cadmium, aluminum, manganese, iron, nickel and the like.

The tetra lower alkyl titanates are outstandingly effective as ester exchange catalysts in reaction stage (1) of the process. The catalyst can be used effectively in concentrations of 0.01 percent to 5 percent by weight based on the total weight of reactants, although concentrations of catalyst of from around 0.1 percent to around 0.5 percent by weight are preferred. The initial condensation or polyesterification reaction of stage (1) is conducted in an essentially oxygen-free atmosphere of gas which is inert to the reaction conditions, such as nitrogen, carbon dioxide, methane, helium, argon, or mixtures of these gases; and the by-product alkanol (when using a diester reactant) preferably is removed by sparging with an inert gas, at atmospheric or other pressure.

This initial polyesterification or condensation stage (1) is terminated when substantially all of the by-product alkanol (or water in the case where a diacid reactant is used), together with most of any excess diol reactant, preferably around 90 percent of the excess, has been removed during the inert gas sparging operation. Usually this point can be determined visually by observing when a marked increase in the viscosity of the reaction mixture occurs. The precise limits of viscosity change varies from one reaction mixture to another. In general the intermediate polyester condensates of reaction stage (1) are quite viscous liquids. They are soluble in such organic solvents as ethyl acetate, diethyl ether, dioxane, benzene, acetone, methyl ethyl ketone and other ketones, and carbon tetrachloride. They are insoluble in water and in aliphatic hydrocarbons such as pentane, hexane, heptane and cyclohexane.

In reaction stage (2) of the process, the treatment of the intermediate polyester condensate product of the first reaction step with water (i.e., the partial hydrolysis of the polyester condensate) is conducted at a temperature between about 60° C. and 100° C., with the preferred temperature range being between about 75° C. and 95° C. The total quantity of water advantageously employed can vary between about 10 percent by weight and 100 percent by weight, based on the weight of intermediate polyester condensate. The hydrolysis reaction can be accomplished with an initial stoichiometric quantity of water that is the calculated equivalent of the portion of acetal groups that is to be hydrolyzed, then an additional quantity of water can be added to form a casting solution of desired consistency. An organic solvent such as tetrahydrofuran can be employed to form the casting solution rather than water but all the advantages of an aqueous solvent over a noxious, flammable organic solvent are sacrificed. In an alternative method, the full amount of water that is required for the hydrolysis and for forming a casting solution is added as the initial charge and an aqueous solution of one of the novel, partially hydrolyzed spirobi(meta-dioxane) polyesters of this invention is obtained directly as the final product of the process.

The hydrolysis reaction stage can be performed satisfactorily in a reaction time varying within the range between about 1 and 6 hours. It is preferred, however, in the practice of this invention to conduct the hydrolysis reaction stage with between about 50 percent by weight and 100 percent by weight of water and between about 0.1 percent and 20 percent by weight of an acid catalyst, based on the weight of intermediate polyester condensate, at a temperature between about 75° C. and 95° C. until a homogeneous solution is formed. One main advantage of the preferred hydrolysis method is that the observed formation of a homogeneous solution during the reaction is an excellent indication that the intermediate polyester condensate has been sufficiently modified by hydrolysis to form one of the novel resinous polyesters of this invention.

Among the acids which can be employed to catalyze the hydrolysis reaction stage are mineral acids such as sulfuric acid, hydrochloric acid, phosphoric acid, and the like; acid salts such as sodium and potassium acid sulfate, zinc chloride, and the like; Lewis acid boron derivatives such as boron trifluoride, boron trifluoride etherate, and the like; and organic acid derivatives such as methanesulfonic acid, p-toluenesulfonic acid, and the like.

In the process described hereinabove for producing the novel resinous polyesters, it is believed that the intermediate polyester condensate of reaction stage (1) is a linear polyester containing recurring spirobi(meta-dioxane) groups, and that the modification effected by the hydrolytic conditions of reaction stage (2) comprises scission of spirobi(meta-dioxane) rings at the acetal positions with the formation of hydroxyl groups. The water solubility of a resinous polyester increases as the number of hydroxyl groups formed by acetal hydrolysis increases. The mechanism of reaction proposed for the hereindescribed process is merely theoretical and should not be construed as limiting the scope of this invention. Other theories or reasons may equally well explain the true course of the process reactions.

The conversion of the water-soluble polyesters to a water- and organic solvent-insoluble and infusible form can generally be effected by heating the former to temperatures within the range between about 125° C. and 275° C. under conditions favoring polymerization and cross-linking of the water-soluble polyesters. This phase of the process can be conveniently carried out under vacuum at lower temperatures for the elimination of water, excess diol and other volatile materials not a substantive part of the polyester resin.

When a polyester resin to be converted is in the form of a film, sheet, layer, filament, or other article that is relatively thin in at least one of its dimensions, curing temperatures in the range between about 125° C. to 175° C. are commonly used. The higher conversion temperatures up to about 275° C. are useful when treating an unshaped large mass of polyester resin. In this case the resultant mass of cross-linked resin can be pulverized and converted to a gel by grinding with swelling agents or semi-solvents such as dimethylformamide, butyl "Carbitol," and the acetate ester of β-ethoxyethanol. The gel can be applied to paper or a textile fabric in a calendering process to yield an adherent coating useful in the manufacture of laminated articles.

The final cross-linking stage in general is complete when the shaped article or the bulk product is free from tackiness and, in the case of the cooled film, has a relatively hard, firm surface. The products are solid cross-linked infusible resins which are insoluble in water and in such common solvents as benzene, toluene, acetone, methyl ethyl ketone and other ketones, diethyl ether, dibutyl ether, dioxane and other ethers, and in aliphatic hydrocarbons. The products are softened by the acetate and propionate esters of β-ethoxyethanol, β-methoxyethanol, β-ethoxy-(2-ethoxy)ethanol, β-butoxy-(2-ethoxy)ethanol, and by dimethylformamide and nitrobenzene.

Shaped articles of the polyester resins heat-cure to hard, glossy, infusible, solvent resistant coatings in a short period of time. The polyester resins heat-cure to a tack-free condition in less than one hour at temperatures between about 125° C. and 150° C. This curing time is considerably less than is required for articles shaped from the intermediate polyester condensate produced by reaction stage (1) of the herein described process. These latter resins require a curing time of between about two hours and twenty hours to produce hardness, flexibility, solvent resistance and other desirable properties in the shaped polyester articles. Besides a shorter curing period, the novel hydrolysis-modified polyesters of this invention have the additional advantage over the reaction stage (1) intermediate polyesters in having greater resistance to solvents in their respective heat-cured forms.

A particularly outstanding feature of the polyesters of this invention is their ability to be cast as a solution in an aqueous vehicle and converted by heating the a cross-linked resin having excellent properties for protective coating and molding applications. The advantages of an aqueous vehicle over an organic solvent vehicle are numerous. Organic solvents are expensive and noxious, and they are hazardous to handle in normal coating and molding applications. In addition, a solvent recovery system is usually necessary when organic solvents are employed, and the clean-up problem is more difficult to manage.

The spirobi(meta-dioxane) diesters and diacids used as starting materials in the practice of this invention can be made by heating and condensing, in a reaction medium or diluent inert to the reactants, at temperatures within the range from 50° C. to about 150° C. in the presence of an acidic catalyst such as sulfuric acid, a β-, γ-, or δ-formyl alkanoic ester or mixtures thereof and pentaerythritol, neutralizing the resultant reaction mixture, filtering the neutralized mixture, and stripping the resulting filtrate of diluent and any unreacted formyl compound under high vacuum. The formyl alkanoic ester and the pentaerythritol can be reacted in molar ratio range between 2 to 1 and 5 or more to 1, although a molar ratio around 2.2 to 1 is generally preferred.

Formyl alkanoic esters useful in that process include those having structures

wherein R designates a divalent aliphatic radical of the formula $C_nH_{2n}$ having two to eighteen carbon atoms and X designates a member of the class consisting of the —$COOR^2$ radicals wherein $R^2$ designates a member of the class consisting of the alkyl groups having one to fourteen carbon atoms.

The diacid reactants used in the process of this invention are readily prepared from the corresponding diesters described above by saponifying the latter with water in the presence of an alkaline reagent such as sodium hydroxide, in a diluent such as methanol, at temperatures in the range from about 20° C. to about 100° C. The reaction mixture then is neutralized with a mineral acid such as sulfuric acid or hydrochloric acid; and the neutralized reaction mixture is filtered, and the insoluble diacid product is washed with water and dried.

The spirobi(meta-dioxane) diesters and diacids used as starting materials in the present invention, and methods for their production, are disclosed in our pending application Serial No. 705,757, filed December 30, 1957.

The following examples will serve to illustrate particular embodiments of the invention.

*Example 1*

This example illustrates the preparation and recovery of an intermediate polyester condensate product from reaction step (1) of the process of this invention, and the casting and curing of the intermediate polyester condensate in the form of a film.

The diester, 3,9-bis(carbethoxyethyl)-2,4,8,10-tetraoxaspiro(5.5)hendecane (18.0 grams, 0.05 mole), and charged with ethylene glycol (3.4 grams, 0.055 mole) and tetrabutyl titanate (0.02 gram) to a tubular glass reaction vessel constructed with a sintered glass filter at the bottom through which nitrogen was introduced. The reaction vessel was immersed in a hot oil bath and was heated at a temperature of 175° C. while nitrogen was passed through the molten contents. After six hours of heating, no further evolution of ethanol was observed and the polymer was viscous and flowed with difficulty. The reaction mixture was cooled to below about 80° C. and benzene (25 milliliters) was added to thin the mixture to a consistency suitable for casting. Methanesulfonic acid (0.04 gram) was added as a curing catalyst and the solution was sprayed onto glass plates. After most of the volatile solvent had evaporated, the films were cured in a circulating air oven at 150° C. for a period of six hours. The films were tack-free, tough, clear and had excellent adhesion to the glass surface. In Example 3, films prepared according to the procedure of this example were tested for solvent resistance in comparison to films prepared by the method of Example 2.

*Example 2*

This example illustrates the preparation of one of the novel polyesters of this invention, and the application and curing of films cast from an aqueous solution of the polyesters.

The diester, 3,9-bis(carbethoxyethyl)-2,4,8,10-tetraoxaspiro(5.5)hendecane (18 grams, 0.050 mole), was charged with ethylene glycol (3.4 grams, 0.055 mole) and tetrabutyl titanate (0.02 gram) to a reaction vessel similar to that described in Example 1 and reacted for three hours at 175° C. The reactor and contents were cooled to a temperature of 80° C., and water (0.9 gram, 0.05 mole) and methanesulfonic acid (0.04 gram) were added to the reaction mixture and the reactor was heated at a temperature of 80° C. to 88° C. with agitation being provided by nitrogen ebullition. An additional 15 grams of water were added during the heating period. At the end of two hours the reaction mixture became homogeneous, and the resulting aqueous solution, containing approximately 50 percent solids, was cooled to room temperature and cast as films on glass plates. The film were cured in a forced air oven at a temperature of 150° C. After a thirty-minute cure the films were slightly tacky while hot but completely tack-free when cold, and after a one-hour cure the films were free of tackiness even when hot. The cured films were hard and glossy, and had excellent adhesion to the glass plates.

*Example 3*

Films prepared from the polyesters of Example 1 and Example 2 were tested for solvent resistance by contacting the film surfaces with various solvents. The superior solvent resistance of the hydrolysis-modified polyester as compared to the intermediate polyester condensate product is shown in the following table:

| Film | From Unhydrolyzed Polymer | From Hydrolyzed Polymer |
|---|---|---|
| Hours cure at 150° C | 6 | 1 |
| Solvent: | | |
| Diethyl Carbitol | Attacks easily | Softens. |
| Isopropyl ether | Softens | No effect. |
| Petroleum ether | ____do____ | Do. |
| Dibutyl Cellosolve | ____do____ | Do. |
| Nitrobenzene | Attacks easily | Attacks easily. |
| Benzene | Slightly softens | No effect. |
| Methanol | ____do____ | Slightly softens. |
| Carbitol acetate | Attacks easily | Attacks easily. |
| Xylene | No effect | No effect. |
| Cyclohexane | ____do____ | Do. |
| Dimethylformamide | Attacks easily | Attacks easily. |

What is claimed is:

1. A process for the production of resinous water soluble polyesters which comprises (1) forming an intermediate polyester condensate by heating and condensing at a temperature within the range between about 125° C. and 225° C. a mixture comprising (a) a spirobi(meta-dioxane) compound having the structure:

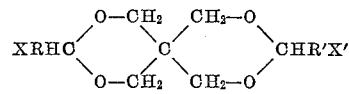

wherein R and R' are selected from the class consisting of divalent aliphatic radicals of the formula $C_nH_{2n}$ wherein $n$ is an integer from 2 to 18, and the cyclohexylene radical; and X and X', respectively, designate —$COOR^2$ radicals wherein $R^2$ designates a member of the class consisting of hydrogen and the alkyl radicals having one to fourteen carbon atoms; and (b) a member of the class consisting of the alkanediols of the structure

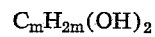

where $m$ is an integer from 2 to 10 and the polyoxyalkylene diols of the structure

where $R^3$ is of the class consisting of hydrogen and the methyl radical and $p$ is an integer from 1 to 3, the said diol and spirobi(meta-dioxane) compound being reacted in the range of molar ratios of from 1:1 to 5:1, said diol having a boiling point higher than that of the by-product $R^2OH$, removing the by-product $R^2OH$ as it is formed, and continuing the heating until substantially all formation and evolution of the R²OH has ceased; and (2) partially hydrolyzing said intermediate polymer condensate at a temperature within the range between about 60° C. and 100° C. with between about 10 percent and 100 percent by weight of water, based on the weight of intermediate polymer condensate, in the presence of a catalytic quantity of acid for a period of time between about 1 and 6 hours.

2. A process for the production of resinous water soluble polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure:

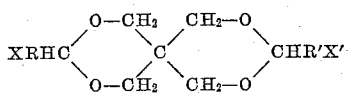

wherein R and R' are selected from the class consisting of divalent aliphatic radicals of the formula $C_nH_{2n}$ wherein $n$ is an integer from 2 to 18, and the cyclohexylene radical; and X and X', respectively, designate —COOR² radicals wherein R² designates a member of the class consisting of hydrogen and the alkyl radicals having one to fourteen carbon atoms; and (b) a member of the class consisting of the alkanediols of the structure $C_mH_{2m}(OH)_2$ where $m$ is an integer from 2 to 10 and the polyoxyalkylene diols of the structure $$HOCH_2CHR^3(OCH_2CHR^3)_pOH$$

where R³ is of the class consisting of hydrogen and the methyl radical, and $p$ is an integer from 1 to 3, the said diol and spirobi(meta-dioxane) compound being reacted in the range of molar ratios of from 1:1 to 5:1, said diol having a boiling point higher than that of the by-product R²OH, removing the by-product R²OH as it is formed, and continuing the heating until substantially all formation and evolution of the R²OH has ceased; and (2) partially hydrolyzing said intermediate polyester condensate with between about 50 percent and 100 percent by weight of water in the presence of between about 0.01 percent and 5.0 percent by weight of acid catalyst, based on the weight of intermediate polyester condensate, at a temperature within the range between about 60° C. and 100° C. until a homogeneous solution is formed.

3. A process for the production of resinous water soluble polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure:

wherein R and R' are selected from the class consisting of divalent aliphatic radicals of the formula $C_nH_{2n}$ wherein $n$ is an integer from 2 to 18, and the cyclohexylene radical; and X and X', respectively, designate —COOR² radicals wherein R² designates a member of the class consisting of hydrogen and the alkyl radicals having one to fourteen carbon atoms; and (b) an alkanediol having two to ten carbon atoms and having two primary hydroxyl groups, the said diol and spirobi(meta-dioxane) compound being reacted in a molar ratio within the range from 1:1 to 5:1, said diol having a boiling point higher than that of the by-product R²OH, removing the by-product R²OH as it is formed, and continuing the heating until substantially all formation and evolution of the R²OH has ceased; and (2) partially hydrolyzing said intermediate polyester condensate with between about 50 percent and 100 percent by weight of water in the presence of between about 0.01 percent and 5.0 percent by weight of acid catalyst, based on the weight of intermediate polyester condensate, at a temperature within the range between about 60° C. and 100° C. until a homogeneous solution is formed.

4. A process for the production of resinous water soluble polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure:

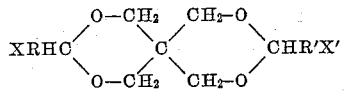

wherein R and R' are selected from the class consisting of divalent aliphatic radicals of the formula $C_nH_{2n}$ wherein $n$ is an integer from 2 to 18, and the cyclohexylene radical; and X and X', respectively, designate —COOR² radicals wherein R² designates a member of the class consisting of hydrogen and the alkyl radicals having one to fourteen carbon atoms; and (b) an alkanediol having two to ten carbon atoms and having two secondary hydroxyl groups, the said diol and spirobi(meta-dioxane) compound being reacted in a molar ratio within the range from 1:1 to 5:1, said diol having a boiling point higher than that of the by-product R²OH, removing the by-product R²OH as it is formed, and continuing the heating until substantially all formation and evolution of the R²OH has ceased; and (2) partially hydrolyzing said intermediate polyester condensate with between about 50 percent and 100 percent by weight of water in the presence of between about 0.01 percent and 5.0 percent by weight of acid catalyst, based on the weight of intermediate polyester condensate, at a temperature within the range between about 60° C. and 100° C. until a homogeneous solution is formed.

5. A process for the production of resinous water soluble polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure:

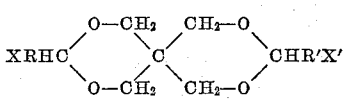

wherein R and R' are selected from the class consisting of divalent aliphatic radicals of the formula $C_nH_{2n}$ wherein $n$ is an integer from 2 to 18, and the cyclohexylene radical; and X and X', respectively, designate —COOR² radicals wherein R² designates a member of the class consisting of hydrogen and the alkyl radicals having one to fourteen carbon atoms; and (b) an alkanediol having two to ten carbon atoms and having one primary hydroxyl group and one secondary hydroxyl group, the said diol and spirobi(meta-dioxane) compound being reacted in a molar ratio within the range from 1:1 to 5:1, said diol having a boiling point higher than that of the by-product R²OH, removing the by-product R²OH as it is formed, and continuing the heating until substantially all formation and evolution of the R²OH has ceased; and (2) partially hydrolyzing said intermediate polyester condensate with between about 50 percent and 100 percent by weight of water in the presence of between about 0.01 percent and 5.0 percent by weight of acid catalyst, based on the weight of intermediate polyester condensate, at a temperature within the range between about 60° C. and 100° C. until a homogeneous solution is formed.

6. A process for the production of resinous water soluble polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure:

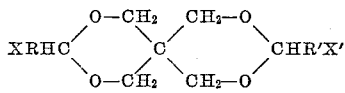

wherein R and R' are selected from the class consisting of divalent aliphatic radicals of the formula $C_nH_{2n}$ wherein $n$ is an integer from 2 to 18, and the cyclohexylene radical; and X and X', respectively, designate —$COOR^2$ radicals wherein $R^2$ designates a member of the class consisting of hydrogen and the alkyl radicals having one to fourteen carbon atoms; and (b) ethylene glycol, said ethylene glycol and spirobi(meta-dioxane) compound being reacted in the range of molar ratios of from 1:1 to 5:1, said ethylene glycol having a boiling point higher than that of the by-product $R^2OH$, removing the by-product $R^2OH$ as it is formed, and continuing the heating until substantially all formation and evolution of the $R^2OH$ has ceased; and (2) partially hydrolyzing said intermediate polyester condensate at a temperature within the range between about 60° C. and 100° C. with between about 10 percent and 100 percent by weight of water, based on the weight of intermediate polyester condensate, in the presence of a catalytic quantity of acid for a period of time between about 1 and 6 hours.

7. A resinous water soluble polyester produced by the process of claim 1.

8. A process for the production of resinous water soluble polyesters which comprises (1) forming an intermediate polyester condensate by heating and condensing at a temperature within the range between about 125° C. and 225° C. in an inert atmosphere a mixture comprising (a) a spirobi(meta-dioxane) compound having the structure:

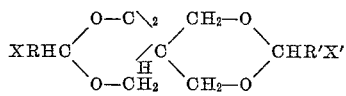

wherein R and R' are selected from the class consisting of divalent aliphatic radicals of the formula $C_nH_{2n}$ wherein $n$ is an integer from 2 to 18, and the cyclohexylene radical; and X and X', respectively, designate —$COOR^2$ radicals wherein $R^2$ designates a member of the class consisting of hydrogen and the alkyl radicals having one to fourteen carbon atoms; and (b) ethylene glycol, said ethylene glycol and spirobi(meta-dioxane) compound being reacted in the range of molar ratios of from 1:1 to 5:1, said ethylene glycol having a boiling point higher than that of the by-product $R^2OH$, removing the by-product $R^2OH$ as it is formed, and continuing the heating until substantially all formation and evolution of the $R^2OH$ has ceased; and (2) partially hydrolyzing said intermediate polyester condensate with between about 50 percent and 100 percent by weight of water in the presence of between about 0.01 percent and 5.0 percent by weight of methanesulfonic acid, based on the weight of intermediate polyester condensate, at a temperature within the range between about 60° C. and 100° C. until a homogeneous solution is formed.

9. A process for improving the solvent resistance of the resinous water soluble polyester of claim 7 which comprises heating the said resinous polyester at a temperature between about 125° C. and 275° C.

10. A resinous cross-linked polyester of improved solvent resistance produced by the process of claim 9.

References Cited in the file of this patent
UNITED STATES PATENTS

| 2,389,662 | Fisher et al. | Nov. 27, 1945 |
| 2,437,046 | Rothrock et al. | Mar. 2, 1948 |
| 2,500,155 | Croxall et al. | Mar. 14, 1950 |
| 2,785,996 | Kress | Mar. 19, 1957 |